(12) United States Patent
Schäfer-Sindlinger et al.

(10) Patent No.: US 6,516,611 B1
(45) Date of Patent: Feb. 11, 2003

(54) PROCESS AND DEVICE FOR REMOVING SOOT FROM THE EXHAUST GAS OF A DIESEL ENGINE

(75) Inventors: Adolf Schäfer-Sindlinger, Frankfurt am Main (DE); Wolfgang Strehlau, Dossenheim (DE); Egbert Lox, Hanau (DE); Thomas Kreuzer, Karben (DE); Ulrich Göbel, Hattersheim (DE)

(73) Assignee: Degussa-Huls Aktiengesellschaft, Frankfurt Am Main (DE)

( * ) Notice: Subject to any disclaimer, the term of this patent is extended or adjusted under 35 U.S.C. 154(b) by 0 days.

(21) Appl. No.: 09/576,069

(22) Filed: May 22, 2000

(30) Foreign Application Priority Data

May 22, 1999 (DE) .......................... 199 23 781

(51) Int. Cl.$^7$ ................................ F01N 3/00
(52) U.S. Cl. .................... 60/297; 60/311; 60/295; 423/215.5
(58) Field of Search .................. 60/297, 311, 295; 423/215.5, 212.2, 213.5

(56) References Cited

U.S. PATENT DOCUMENTS

| | | | | |
|---|---|---|---|---|
| 4,849,399 A | * | 7/1989 | Joy, III et al. ........... | 423/215.5 |
| 4,900,517 A | * | 2/1990 | Domesle et al. ......... | 423/215.5 |
| 4,902,487 A | * | 2/1990 | Cooper et al. ........... | 423/212.2 |
| 5,162,287 A | * | 11/1992 | Yoshimoto et al. ....... | 423/215.5 |
| 5,213,781 A | * | 5/1993 | Abe et al. .................... | 423/239 |
| 5,290,530 A | * | 3/1994 | Muramatsu et al. ...... | 423/213.2 |
| 5,423,904 A | * | 6/1995 | Dasgupta ..................... | 60/311 |
| 5,746,989 A | * | 5/1998 | Murachi et al. ......... | 423/212 R |
| 6,038,854 A | * | 3/2000 | Penetrante et al. ........... | 60/297 |
| 6,185,934 B1 | * | 2/2001 | Teboul .......................... | 60/311 |
| 6,294,141 B1 | * | 9/2001 | Twigg et al. ................... | 60/299 |

FOREIGN PATENT DOCUMENTS

| | | |
|---|---|---|
| EP | 0 341 832 A2 | 11/1989 |
| EP | 0 758 713 A1 | 2/1997 |
| EP | 0 835 684 A2 | 4/1998 |

OTHER PUBLICATIONS

Patent Abstracts of Japan for Publication No. 09079024, dated Mar. 25, 1997.

* cited by examiner

Primary Examiner—Thomas Denion
Assistant Examiner—Diem Tran
(74) Attorney, Agent, or Firm—Kalow & Springut LLP

(57) ABSTRACT

A process for removing soot from the exhaust gas of a diesel engine by oxidizing the nitrogen monoxide present in the exhaust gas to nitrogen dioxide, separating the soot from the exhaust gas stream and oxidizing the soot using the nitrogen dioxide produced. The process is performed in at least two consecutive process stages and the soot is separated from the exhaust gas stream with an efficiency W between 0.05 and 0.95 in each process stage, wherein each process stage can be assigned a transmission for soot in accordance with $T=1-W$ and the total transmission of the process for soot is given as the product of the transmissions of all the process stages.

14 Claims, 1 Drawing Sheet

PROCESS AND DEVICE FOR REMOVING SOOT FROM THE EXHAUST GAS OF A DIESEL ENGINE

INTRODUCTION AND BACKGROUND OF THE INVENTION

The present invention relates to a process for removing soot from the exhaust gas of a diesel engine by oxidizing the nitrogen monoxide present in the exhaust gas to nitrogen dioxide, separating the soot form the exhaust gas stream and oxidizing the soot by using the nitrogen dioxide used. The invention can be used to particular advantage with diesel engines in the lower power range of up to 100 kW.

The limiting values planned for the year 2005 in the European Union for diesel vehicles are aimed at the simultaneous reduction of nitrogen oxide and soot emissions. The limiting values planned for vehicles with a registered total weight of less than 2.5 tons are 0.25 g/km for nitrogen oxides ($NO_x$) and 0.025 g/km for particles. Constructional measures in diesel engines can only reduce one of these two harmful substances at a time, while more of the other is simultaneously produced.

Thus, for example, the emissions of soot are reduced by optimizing the combustion process. The relatively high combustion temperatures required for this, however, lead to increased production of nitrogen oxides. The amounts of nitrogen oxides in their turn can be reduced by measures such as exhaust gas recirculation (EGR), but this again increases the emissions of particles. The current status of development of diesel engines for the field of application mentioned represents an optimum with respect to the emission of nitrogen oxides from these engines in the partial load region is less than 100 vol.ppm; the emission of particles is about 0.5 g/km. Attempts to reduce one of the two components further, by actions taken in the engine, automatically lead to increased emissions of the other hazardous component.

Therefore, the planned exhaust gas limiting values can only be complied with by means of suitable post-treatment of the exhaust gas. The main focus of efforts is to reduce the emission of soot, since the emissions of nitrogen oxides from modern diesel engines are already very close to the planned limiting values.

Currently, soot filters are mainly used for the efficient reduction of soot emissions. So-called wall-flow filters are widely used for this purpose, these being constructed in a honeycomb manner, in a similar way to known catalyst support structures. In wall-flow filters, alternate ends of the flow channels for the exhaust gas passing through the honeycomb structure are sealed so that the exhaust gas has to flow through the porous walls in the filter. These types of wall-flow filters filter up to 95% of the soot from the exhaust gas.

The back pressure of the filter increases as the soot loading increases. Therefore the filters have to be regenerated by burning off the soot. Current conventional methods for soot combustion use thermal or catalytic processes or else additives to the fuel for the continuous or cyclic regeneration of particle filters. Temperatures higher than 600° C. are required for the thermal combustion of soot. The ignition temperature of soot can be lowered considerably by a catalytic coating on the filter.

Thus, DE 3407172 C2 describes a device for treating the exhaust gases from diesel engines which contains a sequence of filter elements either lightly packed or displaced from each other in a housing, wherein at least one filter element A supports a coating which lowers the ignition temperature of soot and at least one filter element B supports a catalyst which promotes the combustion of gaseous hazardous substances and filter elements A and B alternate with each other several times.

EP 341832 B1 describes a process for treating the exhaust gas from heavy trucks. The exhaust gas is first passed over a catalyst, without filters, in order to oxidize the nitrogen monoxide contained therein to nitrogen dioxide. The exhaust gas, containing nitrogen dioxide, is then used to burn off the particles deposited on a downstream filter, wherein the amount of nitrogen dioxide is sufficient to bring about the combustion of particles stored on the filter at a temperature of less than 400° C.

EP 835684 A2 describes a process for treating the exhaust gas from vans and passenger cars. According to this process, the exhaust gas is passed over two catalysts connected in sequence, the first of which oxidizes nitrogen monoxide present in the exhaust gas to nitrogen dioxide which then oxidizes soot particles, which have been deposited on the second catalyst, to $CO_2$, wherein nitrogen dioxide is reduced to nitrogen in accordance with the following equation:

$$2NO_2 + 2C \rightarrow 2CO_2 + N_2 \qquad (1)$$

WO 99/09307 describes a process for reducing soot emissions from heavy trucks. According to this process, the exhaust gas is first passed over a catalyst to oxidize nitrogen monoxide to nitrogen dioxide and then over a soot filter on which the deposited soot is continuously oxidized. Some of the purified exhaust gas is passed over a cooler and then mixed with the intake air for the diesel engine.

A prerequisite for the trouble-free functioning of the last process is the presence of a sufficient quantity of nitrogen dioxide for as complete combustion as possible of the soot contained in the exhaust gas to proceed in accordance with equation (1).

Modern diesel engines for vans and passenger cars, however, generally use exhaust gas recirculation (EGR) in order to keep the nitrogen oxide emissions as low as possible. In the exhaust gas from these types of diesel engines, less than 100 vol.ppm of nitrogen oxides are generally observed. As a result of the low exhaust gas temperatures (<250° C.), in particular from passenger car diesel engines, the efficiency of the process is further restricted because, even with high nitrogen oxide emissions, sufficient amounts of nitrogen dioxide cannot be produced.

The amounts of nitrogen oxides emitted by modern diesel engines with exhaust gas recirculation is not generally sufficient to ensure complete oxidation of soot under all running conditions. In addition, the inventors could not establish complete nitrogen oxide reduction in accordance with equation (1) in the partial load region for passenger cars with diesel engines. Almost as large a quantity of nitrogen oxides was emitted from an exhaust gas treatment device in accordance with EP 835684 A2 as entered the device.

An object of the present invention is therefore to provide a process which also uses oxidation of soot by means of nitrogen dioxide, but which can also be used in the types of diesel engines which have only a low initial emission of nitrogen oxides due to the way the engine is operated. Another object of the invention is to create a device for performing the process.

SUMMARY OF THE INVENTION

The above and other objects are achieved by a process for the removal of soot from the exhaust gas from a diesel engine by oxidizing the nitrogen monoxide present in the exhaust gas to nitrogen dioxide, separating the soot from the exhaust gas stream and oxidizing the soot by using the nitrogen dioxide produced. The process is characterized in that the particular procedure described is performed in at least two consecutive process stages and the soot is separated from the exhaust gas stream in each process stage with an efficiency W of between 0.05 and 0.95, wherein each process stage can be allocated a transmission for soot (T) in accordance with T=1−W and the total transmission of the process for soot is given as a product of the transmissions for all the process stages.

The efficiency W of soot separation, in the context of this invention, is understood to be the difference between the weight of soot per unit of time entering a process stage and the weight of soot per unit of time passing through the process stage, divided by the weight of soot per unit of time entering the process stage. Accordingly, the transmission of a process stage for soot is the quotient of the weight of soot per unit of time passing through a process stage and the weight of soot entering the process stage. The efficiency W of soot separation and the soot transmission T for a process stage are related to each other via T=1−W.

The total transmission $T_g$ of all the process stages is given by the product of the transmissions $T_i$ of all the process stages as expressed by the following equation:

$$T_g = \prod_{i}^{n} T_i \qquad (2)$$

$T_g$: Total transmission
$T_i$: Transmission of ith process stage
n: Number of process stages The present invention is based on the observation that the oxidation of diesel soot in the partial load range of diesel engines largely proceeds not in accordance with equation (1) but more probably in accordance with the following reaction scheme:

$$NO_2+C \rightarrow CO+NO \qquad (3)$$

and $$2CO+O_2 \rightarrow 2CO_2, \qquad (4)$$

since, despite a reduction in the amount of soot separated, no substantial conversion of nitrogen oxides can be measured.

Nitrogen dioxide is thus largely reduced only to nitrogen monoxide under exhaust gas conditions, such as exist under partial load for diesel engines, for oxidizing soot particles in accordance with equation (3).

Since the low concentration of nitrogen oxides in the exhaust gas from modern diesel engines is not sufficient to oxidize all the particles emitted, separation of the soot particles according to the invention is therefore divided into several process stages, wherein the efficiency of separation is between 0.05 and 0.95.

The number of process stages to be used depends on what fraction of the soot emitted can be oxidized by the nitrogen oxides present in the exhaust gas. Since the ratio of nitrogen oxides to soot is not a constant for the engine, but depends, on the particular running conditions, fixing the number of process stages is a compromise. 2 to 4 process stages are generally sufficient.

BRIEF DESCRIPTION OF THE DRAWINGS

The present invention will be further understood with reference to the drawings, wherein.

DETAILED DESCRIPTION OF THE INVENTION

Figure 1:
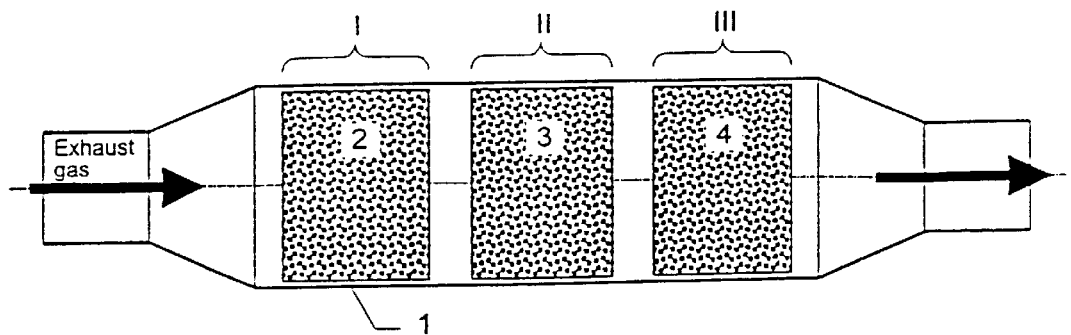
FIG. 1 is a schematic view of a device with three process stages for performing the process according to the invention.

The present invention will now be described in greater detail.

According to the invention, a maximum of 50% of the soot entering each process stage is separated out. The transmission for the first process stage is advantageously chosen so that the amount of soot deposited can be completely burnt away by the nitrogen oxides oxidized to nitrogen dioxide in the exhaust gas. According to equation (3), nitrogen monoxide is then obtained and this is again oxidized to nitrogen dioxide in the second process stage in order to oxidize the soot deposited in the second process stage. Nitrogen monoxide is thus used as an oxygen carrier in the proposed process. Oxidation of carbon monoxide in accordance with (4) takes place in each of the following process steps, together with oxidation of nitrogen monoxide to nitrogen dioxide.

Using the process according to the invention, efforts are made to reduce soot emissions to 30 to 5%, that is to say the total transmission of the process, calculated as the product of the transmissions of all the process stages, is intended to be less than 0.3 to less than 0.05. In order to ensure optimum oxidation of the diesel soot in all the process stages, it is intended, in a preferred embodiment of the process, that the transmission of the diesel soot be reduced in each of the following process stages in such a way that the amount of soot separated out in all the process stages is approximately the same. The transmission values of two consecutive process stages $T_i$ and $T_{i+1}$ must then satisfy the following relationship:

$$T_{i+1} = \frac{2T_i - 1}{T_i} \qquad (5)$$

The transmission of the first process stage in this case is given by $$T_1 = 1/n(T_g+n-1) \qquad (6)$$

The following table lists the transmission values in the individual process stages for the case where the total process is composed of 2, 3 or 4 process stages and the total transmission has a value of 0.05 each time.

TABLE 1

| | Transmission values | | | | |
|---|---|---|---|---|---|
| n | $T_1$ | $T_2$ | $T_3$ | $T_4$ | $T_g$ |
| 2 | 0.525 | 0.095 | | | 0.05 |
| 3 | 0.683 | 0.537 | 0.136 | | 0.05 |
| 4 | 0.763 | 0.689 | 0.548 | 0.174 | 0.05 |

The transmission values in table 1 are obtained from the requirement that the actual amounts of soot separated out in all the process stages is intended to be the same. However, for practical implementation of the process, the values in table 1 should be used only as rough guidelines.

It is therefore a feature of the present invention to provide a process for removing soot from the exhaust gas of a diesel engine by oxidizing the nitrogen monoxide present in the exhaust gas to nitrogen dioxide. The soot is then separated from the exhaust gas stream and is oxidized using the nitrogen dioxide produced in the process.

The procedure described is performed in at least two consecutive process stages and the soot is separated from the exhaust gas stream with an efficiency W, between 0.05 and 0.95 in each process stage. Each process stage can be assigned a transmission for soot in accordance with the equation T=1−W. The total transmission of the process for soot is given as the product of the transmissions of all the process stages.

In carrying out the invention, it is typical that the transmission for soot in each following process stage is reduced in such a way that the amount of soot separated is approximately the same in each of the process stages.

Another feature of the present invention is that the oxidation of the nitrogen monoxide present in the exhaust gas to nitrogen dioxide, the separation and oxidation of the soot particles are performed in at least one process stage on a filter element for soot which is provided with a catalyst coating for the oxidation of nitrogen monoxide to nitrogen dioxide.

The catalyst coating also contains components which promote the combustion of soot.

In actual operation, the exhaust gas is passed over a catalyst for the oxidation of nitrogen monoxide to nitrogen dioxide and then over a filter element for capturing the soot. The catalyst typically exerts substantially no filtering effect on the soot particles. The filter element can also be provided with a coating which promotes the combustion of soot. Suitable filters can be used for this purpose, such as wall-flow filters, deep-bed filters or cross-channel filters.

After passing through the process stages for the removal of soot, the exhaust gas is subjected to a further purification stage in which the nitrogen oxides still present and residual hydrocarbons and carbon monoxide are removed.

Another feature of the invention relates to a device for performing the hereinafter described process. The device contains at least two treatment units arranged in sequence and consisting of a catalyst to oxidize nitrogen monoxide to nitrogen dioxide and a filter element to filter out diesel soot. The transmission of the filter elements for diesel soot is between 0.5 and 0.95, and the total transmission of all the filter elements in the device for diesel soot, calculated as the product of the transmissions of all the filter elements, is less than 0.05. The transmission of one filter element, as compared with that of each preceding filter element, is reduced in such a way that the amount of soot deposited on all the filter elements is approximately the same.

A catalyst to reduce nitrogen oxide is located downstream of the treatment units consisting of catalysts and filter elements. The treatment units are arranged to be located inside a common converter housing. At least one treatment unit is located in a separate converter housing. According to this aspect of the invention, the device contains at least two treatment units arranged in sequence. Each unit contains a filter element for soot which is provided with a catalyst coating for oxidizing nitrogen monoxide to nitrogen dioxide and with catalyst components which promote the combustion of soot.

According to the invention, in each process stage nitrogen monoxide is oxidized to nitrogen dioxide, soot is separated from the exhaust gas and this is burnt away with the aid of the nitrogen dioxide produced in the process. A suitable catalyst is expediently used to oxidize the nitrogen monoxide. To separate the soot from the exhaust gas stream, known filters for diesel soot may be used.

In a specific embodiment of the process according to the invention, the oxidation catalyst for nitrogen monoxide and the filter form an integral structural part. For this purpose, the filter may be manufactured from a catalyst material, for example in the form of a foam ceramic. Coating a filter with a suitable catalyst layer is more advantageous. In this embodiment of the process, therefore, the production of nitrogen dioxide, separation of the soot and the combustion thereof take place on the same structural part and proceed, temporally, in parallel with each other.

In another embodiment of the process according to the invention, the catalyst and the filter form separate structural parts. In this case the catalyst is located in front of the filter, with respect to the direction of flow of the exhaust gas, and is not intended to exert any substantial filtering effect on the particles of diesel soot. This, function can be performed by catalysts in the form of known honeycomb structures. These types of honeycomb structures generally have a cylindrical shape and parallel flow channels for the exhaust gas pass through them in the axial direction. They may either be manufactured directly from the catalyst material and form a so-called solid catalyst or may consist of an inert honeycomb support structure with an applied catalyst coating.

In the second embodiment of the process, oxidation of nitrogen monoxide and separation of the diesel soot are spatially separated from each other. The two embodiments may also be combined in any way at all. Additional catalyst components which promote the combustion of soot may be used to support soot oxidation. In the first embodiment of the process, these catalyst components are used as a mixture with the oxidation catalyst for nitrogen monoxide, while in the second embodiment of the process only the soot filter is provided with these catalyst components.

Suitable catalysts for the oxidation of nitrogen monoxide to nitrogen dioxide preferably contain platinum as the catalytically active component, on a support material such as, for example, active aluminum oxide, aluminum silicate, titanium oxide, zirconium oxide, silicon dioxide and mixed oxides of these materials. These materials should have a specific surface area (BET surface area, measured in accordance with DIN 66132) of at least 5 $m^2/g$, in order to enable the most highly disperse possible deposition of platinum on this surface area. To stabilize these materials against high exhaust gas temperatures, they may be doped with suitable stabilizers, for example γ-aluminum oxide doped with lanthanum or barium oxide. The concentration of platinum on the final catalyst should be between 0.5 and 5 g per liter of catalyst volume in order to ensure adequate oxidation of the nitrogen monoxide. The techniques used to produce this type of catalyst are known to a person skilled in the art.

Any known filter elements for diesel soot are suitable as filter elements for the process stages, wherein care should be taken to see that their filtering effect is chosen to correspond to the requirements for the various process stages. Appropriate measures for this purpose depend on the type of filter used. Known wall-flow filters, foam ceramics, wire or fibre interlaced networks, cross-channel filters and others are suitable. Foam ceramics and networks belong to the class of so-called deep-bed filters. Their transmission can be modified in a simple way, for example by altering the length thereof in the direction of flow of the exhaust gas.

Wall-flow filters consist of a porous honeycomb structure with channels which are sealed at alternate ends so that the exhaust gas has to flow through the porous walls of the flow channels when passing through the filter. To modify the efficiency of separation of these filters, they can be produced with different porosities. There is also the possibility of specifying a certain number of flow channels as pass-through channels without a filtering effect in order to reduce the efficiency of separation and to increase their transmission.

The filters in the different process stages may all be of the same filter type. However, different types of filter may also be combined. This facilitates achieving the transmission values required in the different process stages.

Catalyst components which lower the ignition temperature of soot and thus promote the combustion of soot, are described, for example, in German patents DE 3141713 C2, DE 3232729 C2 and DE 3407172 C2, which are relied on and incorporated herein by reference. According to these documents, compounds which contain vanadium such as silver, lithium, sodium, potassium and cerium vanadate, vanadium pentoxide and/or the perrhanates of potassium or silver are suitable for lowering the ignition temperature of diesel soot.

The process is particularly suitable for vehicles with low initial emissions of nitrogen oxides, which already comply with the legal guidelines. After the last process stage the nitrogen oxides still present can therefore be released to the environment. Alternatively, there is naturally the possibility of adding a process stage to reduce the amount of remaining nitrogen oxides. At the same time, oxidation of residual carbon monoxide and any hydrocarbons still present in the exhaust gas also takes place in this stage.

Figure 2:
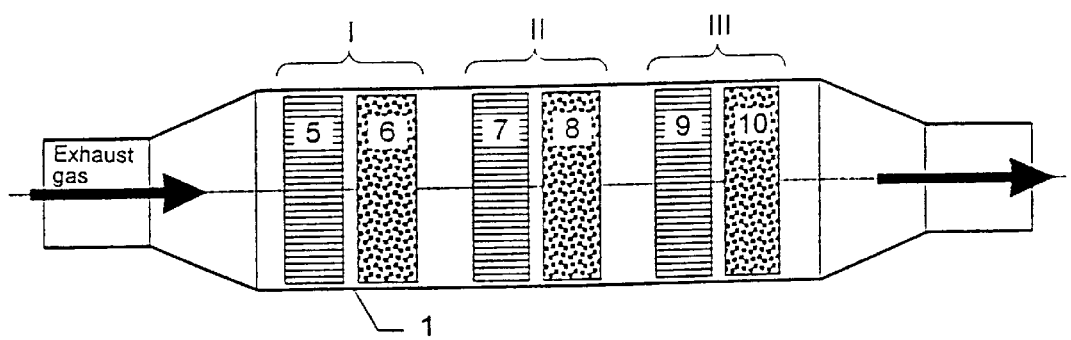
FIG. 2 is a schematic view of a device according to the invention showing that each treatment unit is formed of a catalyst and a filter.
Figure 3:
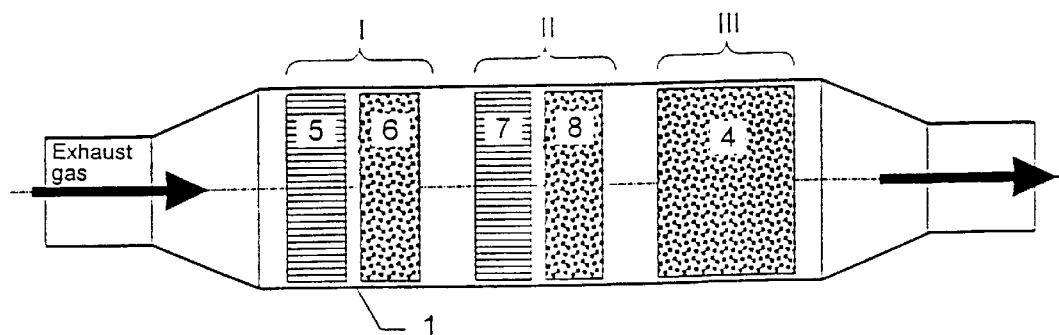
FIG. 3 is a schematic view of a device according to the invention that combines the features of FIGS. 1 and 2.

FIGS. 1 to 3 show three embodiments of the device for performing the process according to the invention, each with three process stages I, II and III.

All three figures show a device consisting of a converter housing (1), inside which the three exhaust gas treatment units are located. The three treatment units correspond to the three process stages I, II and III. In FIG. 1, the three treatment units (2), (3) and (4) are formed by particle filters for soot which are coated with a catalyst for the oxidation of nitrogen monoxide. To reduce soot emissions to less than 5%, the first filter (2) has a transmission of about 70%, the second filter (3) has a transmission of about 55% and the third filter (4) has a transmission of about 13%, in accordance with table 1.

In the device according to FIG. 2, each of the treatment units consists of a catalyst (5), (7) and (9) in a honeycomb structure and a filter for diesel soot (6), (8) and (10). Whereas the catalysts have no noticeable filtering effect, the efficiency, or transmission values, of the filters must be chosen in accordance with table 1.

FIG. 3 shows a combination of the embodiments in FIGS. 1 and 2. The first two treatment units correspond to the treatment units in FIG. 2. The third treatment unit is formed by a filter element in accordance with FIG. 1.

In the devices in accordance with FIGS. 1 to 3, the treatment units assigned to the individual process steps are all placed inside a common converter housing. For reasons of, for example, spatial arrangements on the vehicle, a separate converter housing may be provided for each treatment unit. In certain cases it may also be expedient to locate the catalyst (5) in FIG. 2 in a separate housing near to the engine in order to use the exhaust gas heat to the optimum and thus to obtain better oxidation of the soot.

Further variations and modifications of the foregoing will be apparent to those skilled in the art and are intended to be encompassed by the claims appended hereto.

German application 199 23 781.6 is relied on and incorporated herein by reference.

What is claimed is:

1. A process for removing soot from exhaust gas of a diesel engine comprising oxidizing nitrogen monoxide present in the exhaust gas to nitrogen dioxide, in at least two consecutive process stages, separating the soot from an exhaust gas stream with an efficiency W between 0.05 and 0.95 in each process stage, wherein each process stage is assigned a transmission for soot in accordance with T=1−W and the total transmission of the process for soot is given as the product of the transmissions of all the process stages and oxidizing the soot using the nitrogen dioxide produced; wherein the transmission for soot in each following process stage is reduced in such a way that the amount of soot separated is approximately the same in each of the process stages, and wherein oxidation of nitrogen monoxide to nitrogen dioxide and separation and oxidation of the soot particles is performed on filter elements for soot which are provided with a catalyst coating for the oxidation of nitrogen monoxide to nitrogen dioxide.

2. The process according to claim 1, further comprising:
performing oxidation of the nitrogen monoxide present in the exhaust gas to nitrogen dioxide, separation and oxidation of the soot particles in at least one process stage on a filter element for soot which is provided with a catalyst coating for the oxidation of nitrogen monoxide to nitrogen dioxide.

3. The process according to claim 2, wherein
the catalyst coating also contains components which promote the combustion of soot.

4. The process according to claim 2, wherein
said filter element is a wall-flow filter, deep-bed filter or cross-channel filter.

5. The process according to claim 1, further comprising:
after passing through the process stages for the removal of soot, subjecting the exhaust gas to a further purification stage in which the nitrogen oxides still present and residual hydrocarbons and carbon monoxide are removed.

6. A device for removing soot from exhaust gas of a diesel engine, comprising at least two treatment units arranged in sequence and formed of a filter element for soot which is provided with a catalyst coating for oxidizing nitrogen monoxide to nitrogen dioxide; wherein the transmission of one filter element, as compared with that of each preceding filter element, is reduced in such a way that the amount of soot deposited on all the filter elements is approximately the same.

7. The device according to claim 6, wherein
each filter element has a transmission for diesel soot of between 0.5 and 0.95.

8. The device according to claim 7, wherein
the total transmission of all filter elements in the device for diesel soot, calculated as the product of the transmissions of all the filter elements, is less than 0.05.

9. The device according to claim 6, further comprising
a catalyst to reduce nitrogen oxide located downstream of the treatment units consisting of catalysts and filter elements.

10. The device according to claim 6, wherein
the treatment units are located inside a common converter housing.

11. The device according to claim 6, wherein
at least one treatment unit is located in a separate converter housing.

12. A device for removing soot from the exhaust gas of a diesel engine, comprising at least two treatment units arranged in sequence, each of the units containing a filter element for soot which is provided with a catalyst coating for oxidizing nitrogen monoxide to nitrogen dioxide and with catalyst components which promote the combustion of soot;

wherein the transmission of one filter element, as compared with that of each preceding filter element, is reduced in such a way that the amount of soot deposited on all the filter elements is approximately the same.

13. The device according to claim 12, further comprising a common converter housing for holding the said treatment units.

14. The device according to claim 12, wherein at least one treatment unit is located in a separate converter housing.

\* \* \* \* \*